United States Patent
Kim et al.

(10) Patent No.: US 9,066,075 B2
(45) Date of Patent: Jun. 23, 2015

(54) DEPTH MAP CODING TO REDUCE RENDERED DISTORTION

(75) Inventors: Woo-Shik Kim, Los Angeles, CA (US); Po-Lin Lai, Princeton, NJ (US); Dong Tian, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 548 days.

(21) Appl. No.: 13/138,335

(22) PCT Filed: Nov. 23, 2009

(86) PCT No.: PCT/US2009/006248
§ 371 (c)(1),
(2), (4) Date: Aug. 3, 2011

(87) PCT Pub. No.: WO2010/093351
PCT Pub. Date: Aug. 19, 2010

(65) Prior Publication Data
US 2011/0292043 A1   Dec. 1, 2011

Related U.S. Application Data

(60) Provisional application No. 61/207,532, filed on Feb. 13, 2009, provisional application No. 61/207,892, filed on Feb. 18, 2009, provisional application No. 61/271,053, filed on Jul. 16, 2009, provisional application No. 61/269,501, filed on Jun. 25, 2009.

(51) Int. Cl.
*H04N 13/00* (2006.01)
*H04N 19/597* (2014.01)
(Continued)

(52) U.S. Cl.
CPC ....... *H04N 13/0022* (2013.01); *H04N 13/0011* (2013.01); *H04N 13/0018* (2013.01);
(Continued)

(58) Field of Classification Search
CPC .............. H04N 13/0271; H04N 19/00769; G06T 7/0036; G06T 7/0026
See application file for complete search history.

(56) References Cited

U.S. PATENT DOCUMENTS 5,633,682 A  *  5/1997  Tahara ................... 375/240.23
2004/0104935 A1    6/2004  Williamson et al.
(Continued)

FOREIGN PATENT DOCUMENTS

CN    101309412    11/2008
CN    101374242    2/2009
(Continued)

OTHER PUBLICATIONS

Written Opinion of the International Searching Authority for PCT/US2009/006248 (Jan. 14, 2010).*
(Continued)

*Primary Examiner* — David N Werner
(74) *Attorney, Agent, or Firm* — Robert D. Shedd; Brian J. Cromarty

(57) ABSTRACT

Several implementations relate to depth map coding. In one implementation, a depth coding rate, that results from coding one or more portions of a depth map using a particular coding mode, is determined. The depth map can be used to render video for a different view than that of the depth map. A depth map distortion, that results from coding the one or more portions of the depth map using the particular coding mode, is determined. A value of distortion for the rendered video, based on the depth map distortion and on a particular relationship between the depth map distortion and values of distortion for the rendered video, is determined. It is determined whether to use the particular coding mode to code the one or more portions of the depth map, and the determination is based on the value of distortion for the rendered video and the depth coding rate.

39 Claims, 12 Drawing Sheets

(51) Int. Cl.
  *H04N 13/02* (2006.01)
  *H04N 13/04* (2006.01)
  *G06T 7/00* (2006.01)
  *H04N 19/463* (2014.01)

(52) U.S. Cl.
  CPC .... *H04N13/0044* (2013.01); *H04N 2013/0081* (2013.01); *H04N 13/0271* (2013.01); *G06T 7/0036* (2013.01); *H04N 19/597* (2014.11); *H04N 19/463* (2014.11)

(56) References Cited

U.S. PATENT DOCUMENTS

| | | | |
|---|---|---|---|
| 2005/0244071 | A1 | 11/2005 | Zaharia et al. |
| 2007/0024614 | A1 | 2/2007 | Tam et al. |
| 2007/0030356 | A1 | 2/2007 | Yea et al. |
| 2007/0109409 | A1 | 5/2007 | Yea et al. |
| 2007/0121722 | A1 | 5/2007 | Martinian et al. |
| 2007/0274396 | A1 | 11/2007 | Zhang et al. |
| 2008/0198920 | A1 | 8/2008 | Yang et al. |
| 2008/0247462 | A1 | 10/2008 | Demos |
| 2009/0010507 | A1 | 1/2009 | Geng |
| 2010/0060717 | A1* | 3/2010 | Klein Gunnewiek et al. .. 348/43 |
| 2010/0278232 | A1* | 11/2010 | Yea et al. ............... 375/240.08 |
| 2011/0142138 | A1* | 6/2011 | Tian et al. ............... 375/240.24 |
| 2011/0285910 | A1* | 11/2011 | Bamji et al. ................ 348/631 |
| 2012/0020549 | A1* | 1/2012 | Lee et al. ...................... 382/154 |
| 2012/0054575 | A1* | 3/2012 | Karaoguz et al. ............ 714/752 |
| 2012/0056984 | A1* | 3/2012 | Zhang et al. .................. 348/43 |
| 2012/0086775 | A1* | 4/2012 | Bae et al. ...................... 348/46 |
| 2012/0120192 | A1* | 5/2012 | Alregib et al. ................. 348/43 |
| 2012/0140819 | A1* | 6/2012 | Kim et al. ............... 375/240.03 |
| 2012/0262553 | A1* | 10/2012 | Chen et al. ..................... 348/47 |
| 2012/0320155 | A1* | 12/2012 | Suh et al. ....................... 348/43 |
| 2013/0077853 | A1* | 3/2013 | Chauvier et al. ............. 382/154 |
| 2013/0129190 | A1* | 5/2013 | Cohen et al. ................. 382/154 |
| 2013/0278596 | A1* | 10/2013 | Wu et al. ....................... 345/419 |
| 2014/0225990 | A1* | 8/2014 | Einecke et al. ................ 348/47 |
| 2014/0254937 | A1* | 9/2014 | Fu et al. ........................ 382/195 |
| 2014/0313290 | A1* | 10/2014 | Tech et al. ..................... 348/43 |
| 2014/0362179 | A1* | 12/2014 | Lee ................................. 348/43 |
| 2015/0049821 | A1* | 2/2015 | Chen et al. ............... 375/240.24 |

FOREIGN PATENT DOCUMENTS

| | | |
|---|---|---|
| CN | 101516040 | 8/2009 |
| EP | 1591963 | 11/2005 |
| KR | 100795974 | 1/2008 |
| WO | WO2008071037 | 6/2008 |
| WO | WO 2010151279 A1 * 12/2010 ............. H04N 13/00 |

OTHER PUBLICATIONS

International Preliminary Report on Patentability for PCT/US2010/000355 (Jan. 4, 2012).*
P. Lai, A. Ortega, C.C. Dorea, P. Yin, & C. Gomila, "Improving view rendering quality and coding efficiency by suppressing compression artifacts in depth-image coding", 7257 Proc. SPIE O-1-O-10 (Jan. 19, 2009.*
Oh et al., "H.264-Based Depth Map Sequence Coding Using Motion Information of Corresponding Texture Video", PSIVT 2006, LNCS 4319, Berlin Heidelberg 2006, pp. 898-907.
Penta et al., "Compression of Multiple Depth Maps for IBR", Center for Visual Information Technology, Visual Computer 2005, Sep. 1, 2005, pp. 611-618.
Cernigliaro et al., "Fast Mode Decision for Multiview Video Coding Based on Depth Maps", Visual Communications and Image Processing 2009, Proceedings of SPIE-IS&T Electronic Image, SPIE, vol. 7257, 2009.
Maitre et al., "Rate Distortion Optimal Depth Maps in the Wavelet Domain for Free-Viewpoint Rendering", ICIP 2007.
Nguyen et al., "Error Analysis for Image-Based Rendering with Depth Information", IEEE Transactions on Image Processing, vol. 18, No. 4, Apr. 2009.
Ramanathan et al., Rate-Distortion Analysis for Light Field Coding and Streaming, Elsevier Science, Mar. 1, 2006.
Calderero et al., "Multiple View Region Matching as a Lagrangian Optimizatioin Problem", ICASSP 2007, IEEE, 2007.
Morvan et al., "The Effect of Depth Compression on Multiview Rendering Quality", 3DTV-CON'08, 2008 IEEE, Istanbul, Turkey, May 28-30, 2008.
Sullivan et al., "Rate-Distortion Optimization for Video Compression", IEEE Signal Processing Magazine, Nov. 1998, pp. 74-90.
Ortega et al., "Rate-Distortion Methods for Image and Video Compression", IEEE Signal Processing Magazine, Nov. 1998, pp. 23-50.
Yea et al., "RD-Optimized View Synthesis Prediction for Multiview Video Coding", 2007, IEEE.
Yang et al., "Optimal Subband Filter Banks for Multiple Description Coding", IEEE Transactions on Information Theory, vol. 46, No. 7, Nov. 2000.
Yea et al., "View Synthesis Prediction of Multiview Video Coding", Signal Processing: Image Communication 24, 2009, pp. 89-100.
Ekmekcioglu et al., "A Temporal Subsampling Approach for Multiview Depth Map Compression", IEEE Transactions on Circuits and Systems for Video Technology, vol. 19, No. 8, Aug. 2009.
Search Report Dated Jan. 14, 2010.

* cited by examiner

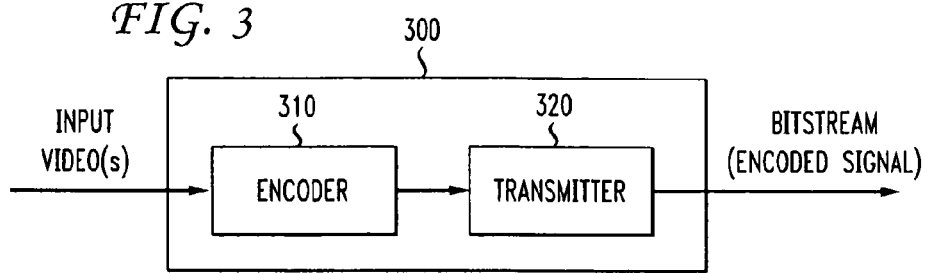
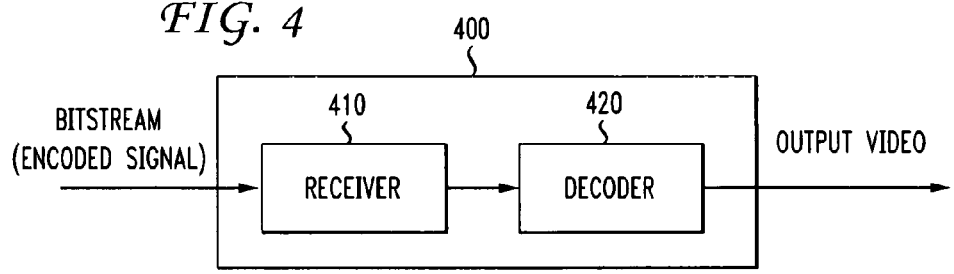

(a) Depth map of View 6

(b) Depth map of View 9

DEPTH MAP CODING TO REDUCE RENDERED DISTORTION

CROSS-REFERENCE TO RELATED APPLICATIONS

This application claims the benefit, under 35 U.S.C. §365 of International Application PCT/US2009/006248, filed Nov. 23, 2009, which was published in accordance with PCT Article 21(2) on Aug. 19, 2010 in English and which claims the benefit of U.S. provisional patent application No. 61/207,532, filed Feb. 13, 2009; U.S. provisional patent application No. 61/207,892, filed Feb. 18, 2009; U.S. provisional patent application No. 61/271,053, filed Jul. 16, 2009 and U.S. provisional patent application No. 61/269,501, filed Jun. 25, 2009.

TECHNICAL FIELD

Implementations are described that relate to coding systems. Various particular implementations relate to depth map coding.

BACKGROUND

In depth image based rendering (DIBR), depth maps are used to render virtual views. The distortion in depth maps (as compared to the ground truth depth, which is the accurate and actual depth) may result in degradation in the visual quality of rendered views. When encoding depth maps, the conventional rate-distortion scheme cannot necessarily provide a direct measurement of rendering quality.

SUMMARY

According to a general aspect, a depth coding rate is determined. The depth coding rate results from coding one or more portions of a depth map using a particular coding mode. The depth map is for a particular view and the depth map can be used to render video for a different view than the particular view to produce a rendered video. A depth map distortion is determined. The depth map distortion results from coding the one or more portions of the depth map using the particular coding mode. A value of distortion for the rendered video is determined. The value of distortion is determined based on the depth map distortion and based on a particular relationship between the depth map distortion and values of distortion for the rendered video. It is determined whether to use the particular coding mode to code the one or more portions of the depth map. The determination of whether to use the particular coding mode is based on the value of distortion for the rendered video and the depth coding rate.

The details of one or more implementations are set forth in the accompanying drawings and the description below. Even if described in one particular manner, it should be clear that implementations may be configured or embodied in various manners. For example, an implementation may be performed as a method, or embodied as apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

BRIEF DESCRIPTION OF THE DRAWINGS

FIG. 3 is a block diagram of an implementation of a video transmitter.
FIG. 4 is a block diagram of an implementation of a video receiver.

DETAILED DESCRIPTION

As mentioned earlier, in DIBR depth maps are used to render virtual views. The distortion in depth maps (as compared to the ground truth depth) may result in degradation in the visual quality of rendered views. When encoding depth maps, the conventional rate-distortion scheme cannot necessarily provide a direct measurement of rendering quality. Furthermore, errors in the estimated depth maps could increase the bitrate when the estimated depth maps are coded using conventional methods. The estimation error usually occurs in flat (homogenous) regions as there are insufficient stereo matching feature points associated with such regions.

In at least one implementation, the inventors encode a depth map corresponding to a first video view. The depth map is encoded, however, not based on the distortion of the depth map encoding. Rather, the depth map is encoded based on the distortion in a video view that is different from the first video view and that is rendered from the first video view and the depth map. In particular, the encoding of the depth map uses a rate-distortion procedure, optimized over various coding modes and other coding options, in which the distortion is the distortion that results in the rendered video view.

In at least one implementation, we propose to utilize camera parameters in coding depth maps. In at least one implementation, we propose to utilize video information in coding depth maps. In at least one implementation, we use such video coding information to code the depth maps such that the negative effect of erroneous depth values can be reduced.

The inventors have recognized that when encoding depth maps, the conventional rate-distortion scheme cannot necessarily provide a direct measurement of rendering quality. This is because, at least, the conventional rate-distortion scheme uses the distortion of the depth map itself, and not a distortion of a rendered picture. Therefore, in at least one implementation, a new distortion metric is proposed, based on the characteristics of the distortion in a depth map and its effect on the rendered views, such that the mode decision can be optimized according to the rendering quality.

The proposed methods and apparatus described herein are expected to improve one or more of the visual quality of the rendered views and the depth map coding efficiency.

Figure 1:
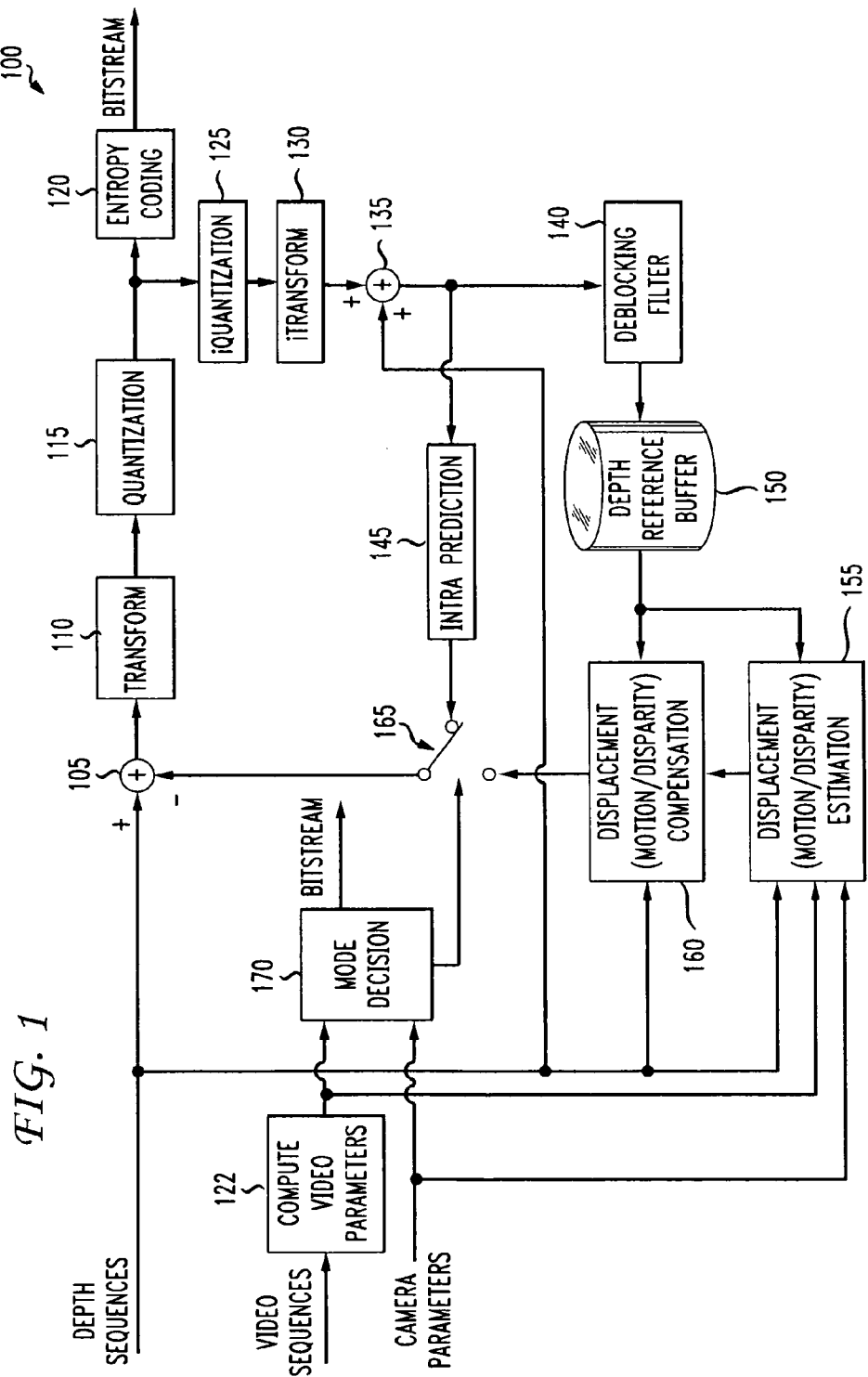
FIG. 1 is a diagram of an implementation of an encoder.

FIG. 1 shows an exemplary video encoder 100 to which the present principles may be applied, in accordance with an embodiment of the present principles. The video encoder 100 includes a combiner 105 having an output connected in signal communication with an input of a transformer 110. An output of the transformer 110 is connected in signal communication with an input of a quantizer 115. An output of the quantizer 115 is connected in signal communication with an input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 135. An output of the combiner 135 is connected in signal communication with an input of an intra predictor 145 and an input of a deblocking filter 140. An output of the deblocking filter 140 is connected in signal communication with an input of a depth reference buffer 150. An output of the depth reference buffer 150 is connected in signal communication with a first input of a displacement (motion/disparity) compensator 160 and a first input of a displacement (motion/disparity) estimator 155. An output of the displacement (motion/disparity) estimator 155 is connected in signal communication with a second input of the displacement (motion/disparity) compensator 160. An output of the displacement (motion/disparity) compensator 160 is connected in signal communication with a first input of a switch 165. An output of the intra predictor 145 is connected in signal communication with a second input of the switch 165. An output of the switch 165 is connected in signal communication with an inverting input of the combiner 105. A second output of a mode decision module 170 is connected in signal communication with the switch 165, for providing a select signal selecting between the first and the second input of the switch 165. An output of a video parameters computer 122 is connected in signal communication with a second input of the mode decision module 170 and a third input of the displacement (motion/disparity) estimator 155.

A non-inverting input of the combiner 105, a third input of the displacement (motion/disparity) compensator 160, and a second input of the displacement (motion/disparity) estimator 155 are each available as inputs of the video encoder 100, for receiving depth sequences. A first input of the mode decision module 170 and a fourth input of a displacement (motion/disparity) estimator 155 are available as inputs of the video encoder 100, for receiving camera parameters. An input of the video parameters computer 122 is available as an input of the video encoder 100, for receiving video sequences. A first output of the mode decision module 170 and an output of the entropy coder 120 are available as outputs of the video encoder 100, for outputting a bitstream.

It is to be appreciated that at least the mode decision module 170 differs from a conventional video encoder in at least the following manners. For embodiment 1 and embodiment 2 described herein after, the mode decision module 170 will input camera parameters and video frames to compute k and n in Equation (5) and Equation (6) such that a new distortion measurement can be calculated for the mode decision. For embodiment 3 described herein, besides the conventional mode decision rules, the mode decision module 170 will also use video frames to determine if the current macroblock should be forced to be encoded using skip mode. For embodiment 4, the mode decision module 170 will calculate the new distortion measurement using camera parameters and video frames, and also check if the current macroblock should be forced to be encoded using skip mode. In other implementations, these functions may be performed, at least in part, by a block other than the mode decision module 170, and even by a block(s) not shown in FIG. 1. For example, another implementation performs these functions in a processing device (not shown in FIG. 1) that controls the encoder of FIG. 1. The control of FIG. 1 includes, in this implementation, providing the inputs to the encoder of FIG. 1, accessing the outputs from the encoder of FIG. 1, and controlling the timing and signal flow of the encoder of FIG. 1.

The mode decision module 170, or a processing device that controls the encoder of FIG. 1, may be implemented in, for example, a general purpose computer, or a function-specific video encoder. Such a computer or encoder may include hardware, firmware, and/or software that is programmed to perform one or more of the algorithms of FIGS. 8-11 or any other algorithm provided in this application.

FIG. 1 shows one implementation. Other implementations are contemplated. For example, another implementation does not have separate inputs on one or more of the blocks of FIG. 1. Rather, a single input is used to receive multiple signals. As a specific example, mode decision module 170 may have only a single input. The single input receives the camera parameters, and also receives the video information from video parameters computer 122. Further, another implementation of mode decision module 170 only has a single output that provides both the bitstream and the select signal. Similarly, the encoder 100 may have a single input for receiving depth sequences, and then route those depth sequences to each of combiner 105, compensator 160, and estimator 155.

Figure 2:
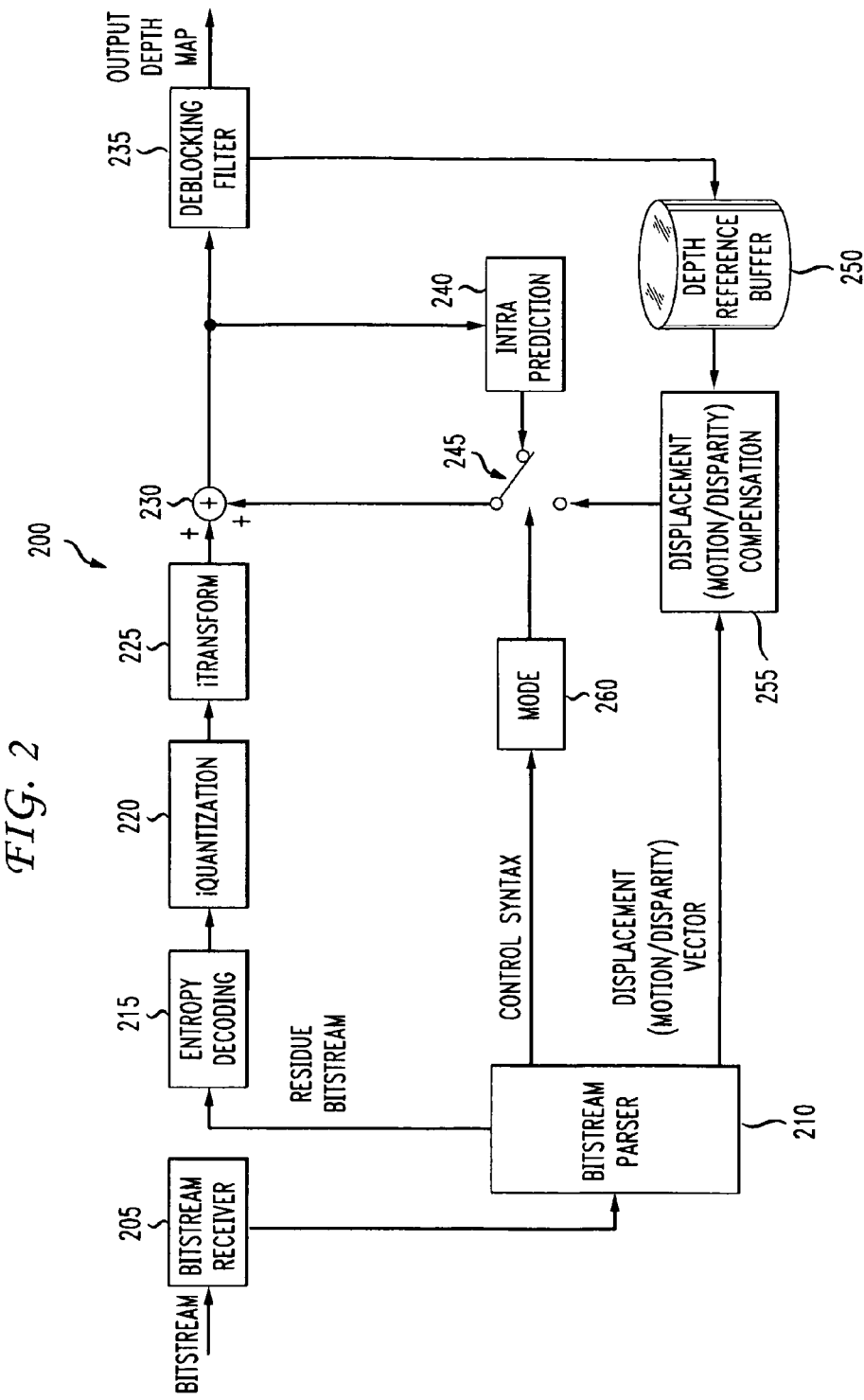
FIG. 2 is a diagram of an implementation of a decoder.

FIG. 2 shows an exemplary video decoder 200 to which the present principles may be applied, in accordance with an embodiment of the present principles. The video decoder 200 includes a bitstream receiver 205 having an output connected in signal communication with an input of a bitstream parser 210. A first output of the bitstream parser 210 is connected in signal communication with an input of an entropy decoder 215, for providing, for example, a residue bitstream. An output of the entropy decoder 215 is connected in signal communication with an input of an inverse quantizer 220. An output of the inverse quantizer 220 is connected in signal communication with an input of an inverse transformer 225. An output of the inverse transformer 225 is connected in signal communication with a first non-inverting input of a combiner 230. An output of the combiner 230 is connected in signal communication with an input of a deblocking filter 235 and an input of an intra predictor 240. An output of the deblocking filter 235 is connected in signal communication with an input of a depth reference buffer 250. An output of the depth reference buffer 250 is connected in signal communication with a first input of a displacement (motion/disparity) compensator 255. An output of the displacement (motion/disparity) compensator 255 is connected in signal communication with a second input of a switch 245. An output of the intra predictor 240 is connected in signal communication with a first input of the switch 245. An output of the switch 245 is connected in signal communication with a second non-inverting input of the combiner 230. An output of a mode module 260 is connected in signal communication with the switch 245, for providing a select signal selecting between the first and the second input of the switch 245. A second output of the bitstream parser 210 is connected in signal communication with an input of the mode module 260, for providing, for example, control syntax for determining the select signal. A third output of the bitstream parser 210 is connected in signal communication with a second input of the displacement (motion/disparity) compensator 255, for providing, for example, a displacement (motion or disparity) vector. An input of the bitstream receiver 205 is available as an input of the video decoder 200, for receiving a bitstream. An output of the deblocking filter 235 is available as an output of the video decoder 200, for outputting a depth map.

FIG. 3 shows an exemplary video transmission system 300, to which the present principles may be applied, in accordance with an implementation of the present principles. The video transmission system 300 may be, for example, a head-end or transmission system for transmitting a signal using any of a variety of media, such as, for example, satellite, cable, telephone-line, or terrestrial broadcast. The transmission may be provided over the Internet or some other network.

The video transmission system 300 is capable of generating and delivering video content encoded using, for example, skip mode with depth, or encoded using one or more of various other modes or techniques. This is achieved by generating an encoded signal(s) including depth information or information capable of being used to generate (including, for example, reconstructing) the depth information at a receiver end that may, for example, have a decoder.

The video transmission system 300 includes an encoder 310 and a transmitter 320 capable of transmitting the encoded signal. The encoder 310 receives video information and generates an encoded signal(s) there from using skip mode with depth. The encoder 310 may be, for example, the encoder 100 described in detail above.

The transmitter 320 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers. The transmitter may include, or interface with, an antenna (not shown). Accordingly, implementations of the transmitter 320 may include, or be limited to, a modulator.

FIG. 4 shows an exemplary video receiving system 400 to which the present principles may be applied, in accordance with an embodiment of the present principles. The video receiving system 400 may be configured to receive signals over a variety of media, such as, for example, satellite, cable, telephone-line, or terrestrial broadcast. The signals may be received over the Internet or some other network.

The video receiving system 400 may be, for example, a cell-phone, a computer, a set-top box, a television, or other device that receives encoded video and provides, for example, decoded video for display to a user or for storage. Thus, the video receiving system 400 may provide its output to, for example, a screen of a television, a computer monitor, a computer (for storage, processing, or display), or some other storage, processing, or display device.

The video receiving system 400 is capable of receiving and processing video content including video information. The video receiving system 400 includes a receiver 410 capable of receiving an encoded signal, such as for example the signals described in the implementations of this application, and a decoder 420 capable of decoding the received signal.

The receiver 410 may be, for example, adapted to receive a program signal having a plurality of bitstreams representing encoded pictures. Typical receivers perform functions such as, for example, one or more of receiving a modulated and encoded data signal, demodulating the data signal from one or more carriers, de-randomizing the energy in the signal, de-interleaving the data in the signal, and error-correction decoding the signal. The receiver 410 may include, or interface with, an antenna (not shown). Implementations of the receiver 410 may include, or be limited to, a demodulator.

The decoder 420 outputs video signals including video information and depth information. The decoder 420 may be, for example, the decoder 400 described in detail above.

Figure 5:
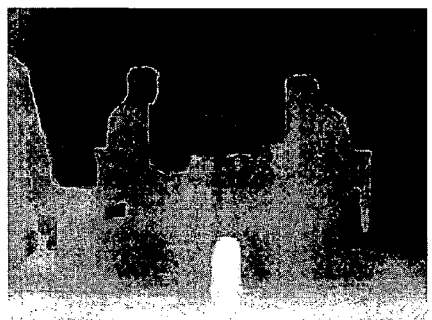
FIG. 5 is an example of a depth map.
Figure 6:
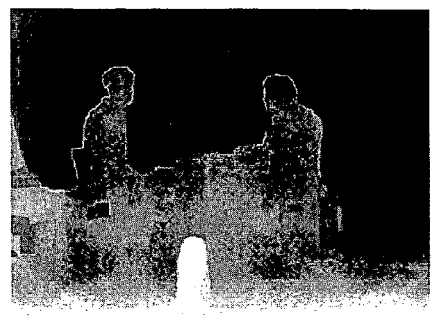
FIG. 6 is another example of a depth map.

New data formats including both video and the corresponding depth maps, such as multi-view plus depth (MVD), enable new video applications such as three-dimensional television (3DTV) and free-viewpoint video (FVV). FIG. 5 shows an example of a depth map 500 to which the present principles may be applied, in accordance with an embodiment of the present principles. FIG. 6 shows an example of another depth map 600 to which the present principles may be applied, in accordance with an embodiment of the present principles. These gray-level depth maps represent depth Z within the range between $Z_{near}$ and $Z_{far}$. The pixel value d is calculated as the following:

$$d = 255 \cdot \frac{\frac{1}{Z} - \frac{1}{Z_{far}}}{\frac{1}{Z_{near}} - \frac{1}{Z_{far}}} \quad (1)$$

Thus, the nearest depth $Z_{near}$ will be mapped to d with value 255 while the furthest depth $Z_{far}$ will be mapped to d with value 0. Typically, depth maps are estimated instead of captured. Intermediate video views (virtual views) can be generated using the techniques of DIBR, which takes the transmitted/stored video views (reference views) and the corresponding depth maps as input. In the estimated depth maps, typically more errors can be observed around object boundaries and in the flat regions with less texture, where the stereo matching suffers due to occlusion and lack of matching features, respectively. This temporal variation in the depth map not only increases the bitrate to encode depth, it also causes artifacts in the rendered views.

Figure 7:
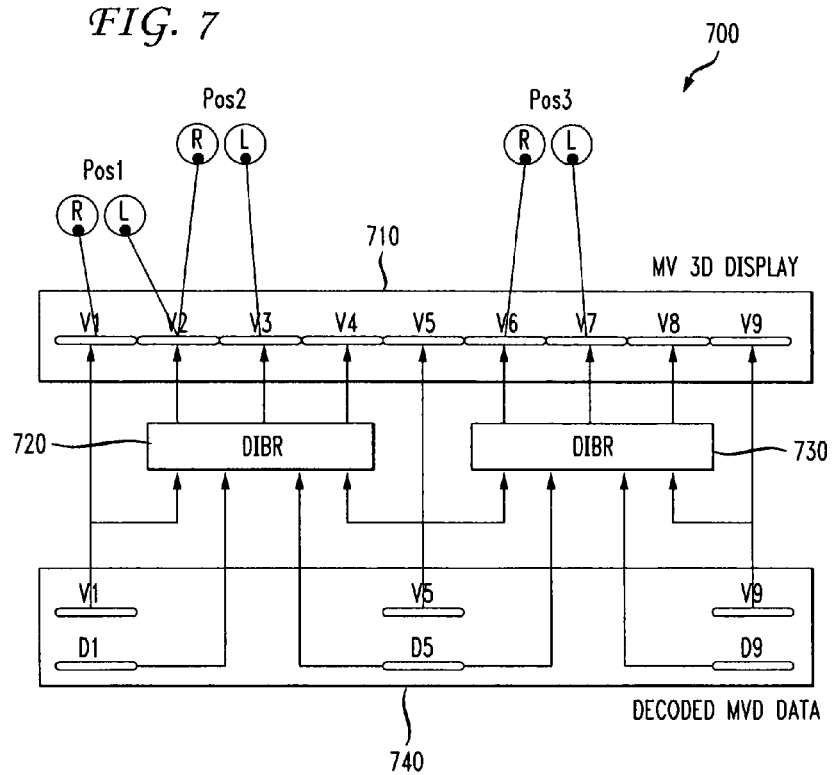
FIG. 7 is a diagram of an implementation of a framework for generating nine output views (N=9) out of 3 input views with depth (K=3).

In order to reduce the amount of data to be transmitted, a dense array of cameras (V1, V2, ... V9) may be sub-sampled and only a sparse set of cameras actually capture the scene. FIG. 7 shows an exemplary framework 700 for generating nine output views (N=9) out of 3 input views with depth (K=3), to which the present principles may be applied, in accordance with an embodiment of the present principles. The framework 700 involves an auto-stereoscopic 3D display 710, which supports output of multiple views, a first depth image-based renderer 720, a second depth image-based renderer 730, and a buffer for decoded data 740. The decoded data is a representation known as Multiple View plus Depth (MVD) data. The nine cameras are denoted by V1 through V9. Corresponding depth maps for the three input views are denoted by D1, D5, and D9. Any virtual camera positions in between the captured camera positions (e.g., Pos 1, Pos 2, Pos 3) can be generated using the available depth maps (D1, D5, D9), as shown in FIG. 7. As can be seen in FIG. 7, the baseline between the actual cameras (V1, V5 and V9) used to capture data can be large. As a result, the correlation between these cameras is significantly reduced and coding efficiency of these cameras may suffer since the coding efficiency may only rely on temporal correlation.

Encoding video and depth may allow for the efficient transmission and/or storage of the above described new data formats. Such encoding represents additional challenges as we should consider not only the conventional rate-distortion performance, but also the quality of DIBR rendered views.

In at least one implementation, new depth map coding methods are presented, which improve coding efficiency and subjective quality of the rendered views, with a new mode selection scheme based on a new distortion metric and/or video information analysis. First, the new distortion metric is derived from the relationship between the distortion of the compressed depth map and the distortion of the DIBR rendered views, which depends on, for example, camera parameters and video characteristics such as, for example, the amount of texture and flat regions. Second, since estimated depth maps are likely to include errors in the flat regions due to the insufficient stereo matching feature points, a skip mode (such as in the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard")) can be selected by analyzing video information. This new skip scheme leads to a reduction of a flickering artifact caused by temporal variation in a depth map.

A rate distortion optimized mode selection scheme has been used in video coding to select the best coding mode to achieve high quality decoded video with reduced bitrate. Using Lagrangian optimization, the best mode is selected which results in a minimum value of L:

$$L = D + \lambda R \quad (2)$$

where D is distortion, $\lambda$ is the Lagrangian multiplier, and R is bitrate. The distortion is usually calculated as the sum of squared difference (SSD) between the original pixel values and the reconstructed pixel values. L can be referred to as a cost, or a coding cost for a given coding mode, and the minimization may occur over all available coding mode costs.

However, when this is applied to depth map coding, for many applications it will be beneficial for the distortion to reflect the distortion of the rendered views, since what is important is the quality of the view that is rendered using the depth map, and not necessarily the quality of the decoded depth map itself. Therefore, for such applications, we demonstrate how to model the relationship between the distortion of the compressed depth map and the distortion of the rendered views, such that the mode decision is optimized with respect to the rendering quality.

Generally, a "rendered" picture is the same as a "synthesized" picture throughout this application. Rendering/synthesizing refers generally to the process of using one or more existing pictures from one or more views to create a new picture from a different view. The new picture reflects what the subject matter of the one or more existing pictures would look like if viewed from the "different" view. Rendering/synthesizing may be performed using, for example, DIBR. DIBR may include functions such as, for example, warping, hole filling, and blending.

The derivation of new distortion based on rendering quality is a two-step process. The first step models how the distortion $\Delta d$ in the compressed depth map leads to displacement $\Delta P$ in the rendering position (rendering position error). Then the second step models the relationship between rendering position error $\Delta P$ and the distortion in the rendered views. In at least one implementation, it is proposed to utilize camera parameters to link compression distortion $\Delta d$ in depth map to rendering position error $\Delta P$. In at least one implementation, it is proposed to utilize a new parameter n, which depends on video characteristics, to link $\Delta P$ to the distortion of the pixel values in the rendered views. Then this distortion metric will be used in the rate-distortion optimization in Equation (2) to obtain a new distortion metric. Embodiment 1 and 2 below provide two exemplary implementations to derive the new distortion metric for depth coding.

Embodiment 1

New Distortion Metric with Camera Parameters and Global Video Parameter n

In DIBR, with parallel cameras arranged on a horizontal line, the distortion $\Delta d$ in depth map at image position (x,y) will result in a horizontal translational error $\Delta P$ in the rendered pixel position (deviation away from the correct rendering location). This rendered position error can be calculated using (1) and camera parameters, which leads to the following:

$$\Delta P = a \cdot \delta_x \cdot \left( \frac{1}{Z(x, y) + \Delta Z(x, y)} - \frac{1}{Z(x, y)} \right) \quad (3)$$
$$= a \cdot \delta_x \cdot \frac{\Delta d(x, y)}{255} \left( \frac{1}{Z_{near}} - \frac{1}{Z_{far}} \right)$$

where a is the focal length of the camera, $\delta x$ is the horizontal distance between two cameras (also called the baseline distance), and $Z_{near}$ and $Z_{far}$ correspond to d with pixel values 255 and 0 in the depth maps, respectively. This reveals that there is a linear relationship between the depth map distortion $\Delta d$ and the translational rendering position error $\Delta P$ in the rendered views, i.e., $$\Delta P = k \cdot \Delta d \quad (4)$$

where k is determined by intrinsic camera parameter a, extrinsic camera parameter $\delta x$, and the values of $Z_{near}$ and $Z_{far}$, as follows:

$$k = a \cdot \delta x \cdot \frac{1}{255} \left( \frac{1}{Z_{near}} - \frac{1}{Z_{far}} \right) \quad (5)$$

Now, given the position error $\Delta P$, we would like to estimate the resulting distortion in the rendered view. Clearly this distortion (in terms of pixel values) will be content dependent. For example, if the video frame includes complex textures and objects, then the distortion caused by $\Delta P$ will be significant as different positions should have quite different pixel values. On the other hand, if the video frame includes simple textures or flat (homogenous) areas, then the amount of distortion due to $\Delta P$ will be small since pixels at different positions are similar.

We propose to use a linear model such that the relationship between the distortion in the rendered view $D_{render}$ (measured as the sum of squared difference (SSD)) and the rendering position error $\Delta P$ can be described using a parameter n as follows:

$$\text{New\_distortion } D_{render} = n \cdot \Delta P = n \cdot k \cdot \Delta d \quad (6)$$

In this embodiment, we propose to capture the content-dependent nature of rendered view distortion by estimating a simple global parameter n for the video. The estimation of the parameter n can be performed as below:

Under different horizontal translations $t_x$, the SSD between the original video frame I(x,y) and the translated one I(x-$t_x$,y) is measured:

$$D_{SSD}(t_x) = \sum_x \sum_y (I(x, y) - I(x - t_x, y))^2 \quad (7)$$

Figure 13:
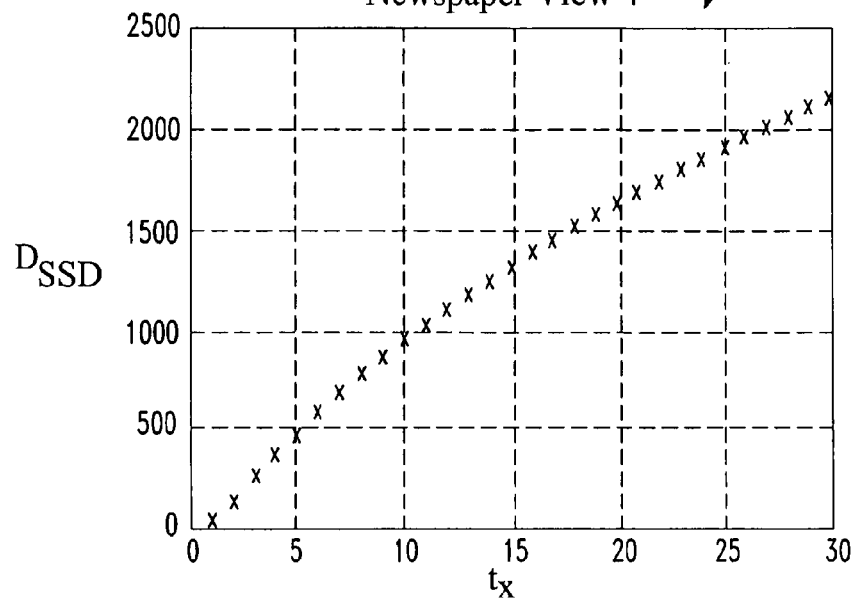
FIG. 13 shows a relationship between translation and distortion for a video sequence depicting a newspaper.
Figure 14:
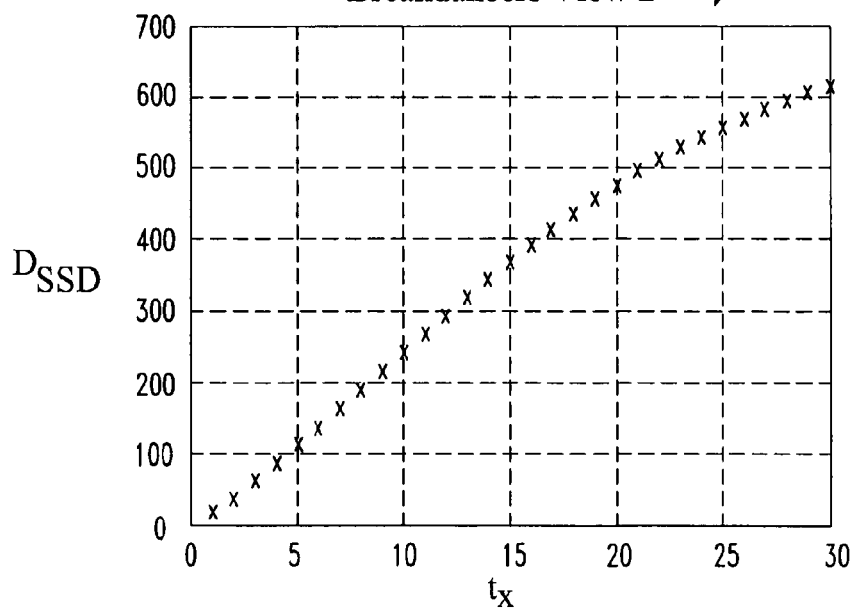
FIG. 14 shows a relationship between translation and distortion for a video sequence depicting breakdancers.

This procedure will collect data points of the global distortion in a video frame in terms of pixel value, due to different translations. By experiment, it is observed that the relationship between $D_{SSD}(\bullet)$ and $t_x$ is approximately linear, as shown in FIGS. 13 and 14, where the first frame of each video sequence is used with $t_x$ from one to thirty pixels. FIG. 13 shows the relationship 1300 between translation and distortion for a video sequence depicting a newspaper, calculated using (7). FIG. 14 shows the relationship 1400 between translation and distortion for a video sequence depicting breakdancers, calculated using (7). Hence, the variable s between $D_{SSD}$ and translation $t_x$ can be found, for example, using the least square linear fit as follows:

$$s = \frac{D_{SSD}^T t_x}{t_x^T t_x} \quad (8)$$

where $D_{SSD}$ and $t_x$ in (8) are the vectors formed by $D_{SSD}(\bullet)$ and $t_x$, respectively, and T denotes the vector transpose operand. The obtained variable s provides an estimation of n, and can be used in Equation (6) with n=s to serve as the new distortion metric in the rate-distortion optimization for depth coding. Note that s is the slope of a linear approximation of n.

Optionally, according to a rendering process which takes multiple views, this variable can be scaled using the same weight the rendering process put on the view. For example, we want to render $V_{render}$ using $V_{left}$, $V_{right}$ and their corresponding depth map sequences with the following weight α:

$$V_{render} = \alpha \cdot V_{left} + (1-\alpha) \cdot V_{right}, \quad (9)$$

Then the new scaled variable, s', to represent global characteristic for $V_{left}$ can be calculated as follows:

$$s' = \alpha \cdot s \quad (10)$$

Using the two parameters k and n=s (or n=s') found above, the new distortion metric $D_{render}$ can be derived as follows:

$$D_{render} = n \cdot \Delta P = n \cdot k \cdot \Delta d, \quad (11)$$

where k is from the camera setting, and n is from the global video characteristics. This new distortion metric can be used in the rate distortion optimized mode selection process using the Lagrangian optimization as follows:

$$L = \sum_x \sum_y D_{render}(x, y) + \lambda R = n \cdot k \sum_x \sum_y |\Delta d(x, y)| + \lambda R, \quad (12)$$

where (x,y) is a pixel position in the block, λ is a Lagrangian multiplier, and R is the bitrate consumed to code the block. Please note that the sum of squared difference of video is replaced with the sum of absolute difference of depth map, followed by the two parameters k, n to estimate the squared difference in synthesized views. Sum of absolute differences ("SAD") is a common metric used in video quality evaluation. Further, SAD is the metric that is assumed, for the distortion of the depth map, in the derivation throughout the above discussion in Embodiment 1.

Note that in the above description, the global video parameter n is used for the entire sequence. Other embodiments, however, update the parameter whenever there is a scene change since the content characteristic may change. Thus, by using some scene-change detection, the encoder will determine when to calculate/update n. Thus, the estimation of n can be performed more than once for a given sequence.

Figure 8:
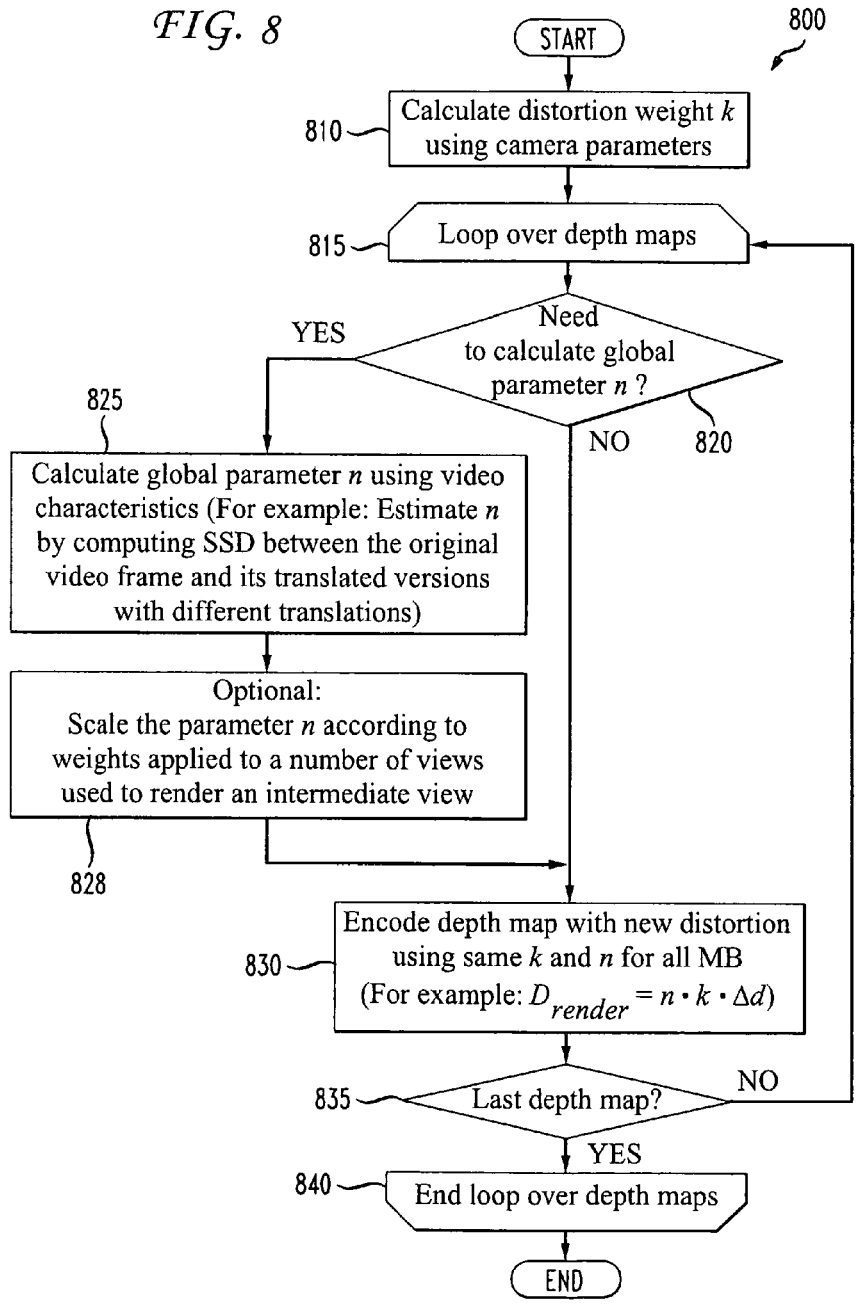
FIG. 8 is a diagram of an implementation of an encoding process.

FIG. 8 shows an exemplary video coding method 800, in accordance with an embodiment of the present principles. Method 800 corresponds to the above described embodiment 1. At step 810, a distortion weight k is calculated using a camera parameter. At step 815, a loop over depth maps begins. At step 820, it is determined whether the global parameter n needs to be calculated. If so, then the method proceeds to step 825. Otherwise, the method proceeds to step 830. It is to be appreciated that for the first depth map, step 820 will return yes. Step 820 may also return yes when a scene-change is detected. At step 825, a global parameter n is calculated using video characteristics. At step 828, optionally, the parameter n is scaled based on the weights applied to a number of views used to render an intermediate view. At step 830, a depth map is encoded with a new distortion metric as per Equation (12) using the same n in all macroblocks (MBs). At step 835, it is determined whether or not the current depth map is the last one in a current depth sequence being processed. If so, then control is passed to a step 840. Otherwise, control is returned to step 815 for the next depth map. At step 840, the loop over the depth maps is terminated.

Note that the loop over the depth maps from steps 815 to 840 refers to a standard looping process. For example, in software, one might use a "for" loop that is performed once for each depth map.

Additionally, the encoding in step 830 may be performed in various ways. It is common, in step 830, to perform a separate rate-distortion optimization procedure for each macroblock of a given depth map. Other implementations do not perform any optimization, or perform an optimization over limited modes, or perform a single optimization over the whole depth map that effectively selects a single mode for encoding all blocks of the depth map.

Note that the above derivation refers for the translation of a rendered picture. However, we are determining "n" by translating the video picture (a non-rendered picture) that corresponds to the depth map, rather than translating a rendered picture. Of course, the translated video picture may be, for example, an original or a reconstructed picture. The use of a non-rendered picture is an approximation. However, given the large similarity between the non-rendered picture and a picture that is rendered based on the non-rendered picture, the approximation generally has a high degree of accuracy. Other implementations do indeed use a rendered view in the determination of "n".

Embodiment 2

New Distortion Metric with Camera Parameters and Localized Parameter n

In Embodiment 1, camera parameters and a global parameter n which models video characteristics were used to construct a new distortion metric for depth coding. However, the characteristics of a frame can differ by local areas within the frame. For example, homogenous floor area, a complicated region such as a human face, and distinct object boundaries, will have very different pixel distributions when we apply translations. An exhaustive approach to adapt local variation can be developed, for example, by calculating parameter n for each block to obtain a more precise result. However, this will increase computational complexity. In this embodiment, while the camera parameters are used the same way as in embodiment 1, for modeling video characteristics, it is proposed to first partition a frame into regions with different characteristics and estimate multiple values of n using similar techniques described in Embodiment 1. Then when encoding a macroblock (MB), the distortion will be calculated based on the n value estimated for the region this MB belongs to.

Thus, a set of n may be obtained for various regions. This set may be used for an a single picture, or multiple pictures such as, for example, an entire sequence.

Note that as in Embodiment 1, the estimated values of multiple local n can be scaled according to the weights applied to the rendering, such as in Equations (9) and (10). Furthermore, estimating a new set of local n based on scene change as described in embodiment 1 can also be applied to this embodiment 2.

Figure 9:
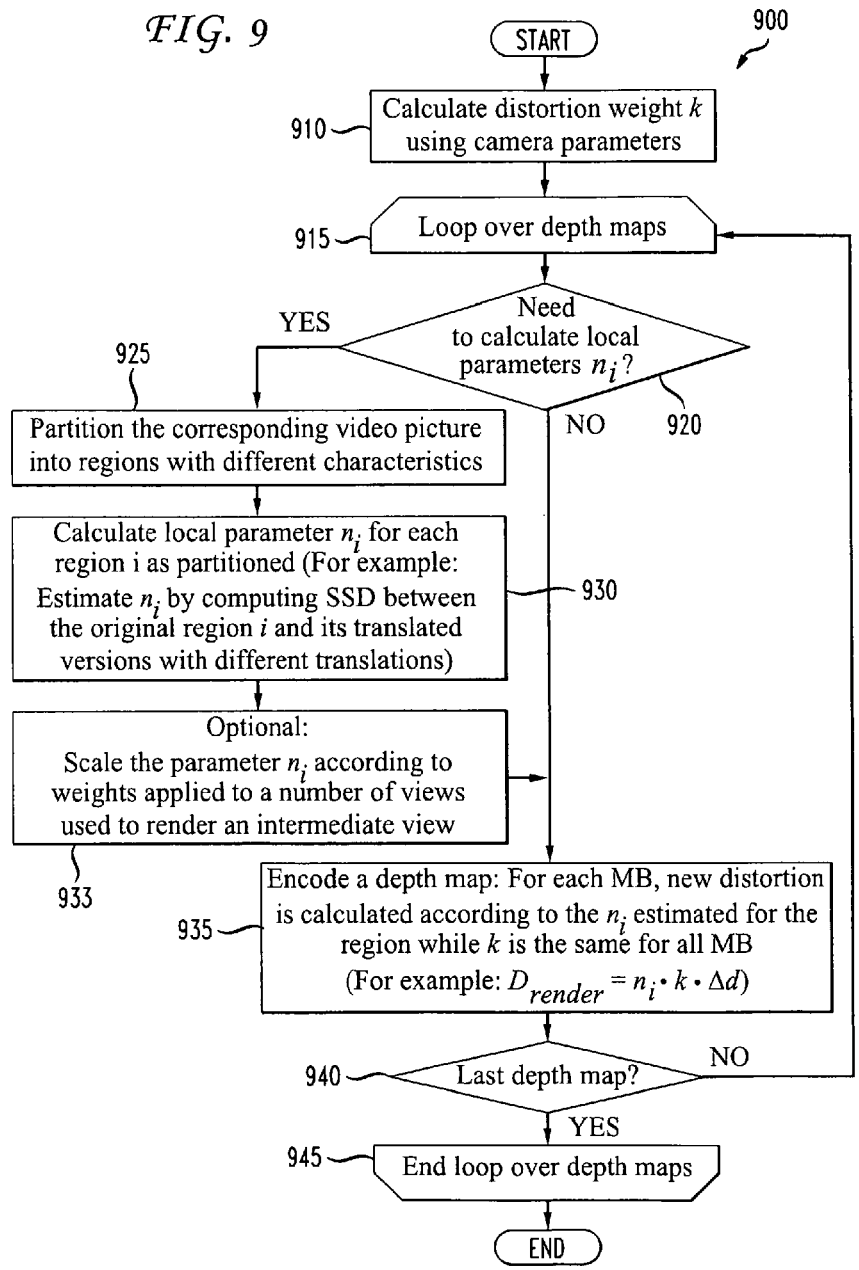
FIG. 9 is a diagram of an implementation of another encoding process.

FIG. 9 shows an exemplary video coding method 900, in accordance with another embodiment of the present principles. Method 900 corresponds to the above described embodiment 2. At step 910, a distortion weight k is calculated using a camera parameter. At step 915, a loop over depth maps begins. At step 920, it is determined whether the local parameters need to be calculated. If so, then the method proceeds to step 925. Otherwise the method proceeds to step 935. It is to be appreciated that for the first depth map, step 920 will return a yes. It may also return yes when a scene-change is detected. At step 925, a current video frame is partitioned into regions with different characteristics. At step 930, a parameter n is calculated for each region as partitioned. At step 933, optionally, the local parameter n are scaled based on the weights applied to a number views used to render an intermediate view. At step 935, the current depth map is encoded by calculating, for each macroblock in the depth map, a new distortion metric as per Equation (12) according to the n estimated for the region in which the macroblock is included. At step 940, it is determined whether or not the current depth map is the last one in a current depth sequence being processed. If so, then control is passed to a step 945. Otherwise, control is returned to step 915 for the next depth map. At step 945, the loop over the depth maps is terminated.

In calculating the local parameters, more than one picture may be used. Additionally, the regions may be determined in various known manners. Regions may be, for example, texture based, or object based. In one implementation, the regions are determined based on the variance of macroblocks in a picture. More specifically, each macroblock in a picture is examined to determine if the variance of that block is above a threshold value. All blocks with variance above the threshold value are grouped into a first region, and all other blocks are grouped into a second region. This variance determination process may be applied to the luminance and/or chrominance blocks.

Embodiment 3

Depth Coding Mode Decision Based on Video Information

In addition to the adjustment of the distortion metric to optimize the rendering quality when encoding depth, the mode decision process can be improved by considering temporal information of a video sequence.

As described before, in the estimated depth maps, errors are likely to occur in flat regions, resulting in noisy depth maps. In such a case, the depth map will be less reliable, and may not be worth spending many bits to code the false variations due to depth estimation errors. This may be true, regardless of what "distortion" measure the encoding may be optimized over.

To attempt to solve this problem, in at least one implementation, it is proposed to utilize video information to help encoding depth maps. The mode selection scheme in depth map coding can often be improved by analyzing video information. An example of such practice is presented in here with respect to embodiment 3.

The approach of one implementation is to compare video frames at different timestamps, and locate areas with very small changes, which usually corresponds to flat areas or static background areas. Since there are very small changes in these areas, there also should be very small changes in their corresponding depth values. If there are changes in depth values, it is likely due to errors in depth estimation, and can be regarded as distortions. The determination that the video has very small changes can be made in various ways.

In one implementation, the video difference is computed as a sum of absolute differences of the relevant macroblocks, and the average of the sum is compared to a threshold. The threshold may be, for example, a fixed number for all blocks, or may be proportional to average intensity of one or more of the video blocks.

In another implementation, the coding mode for one or more of the relevant video blocks is consulted to determine if the video difference is small enough. In video coding, regions with very small changes may be coded using skip mode (such as in the MPEG-4 AVC Standard). Therefore, if skip mode has been selected for the video block, then the video differences are small. As a result, these areas in the depth map can also be coded using skip mode regardless of the false temporal variation. Thus, skip mode is applied to corresponding regions in separate depth maps that do not necessarily have very small changes. Indeed, the corresponding depth portions/regions may have differences large enough that a skip mode would not be selected based on the depth portions themselves.

The last fact is significant. By applying skip mode to a portion of a depth map that has significant changes from a collocated portion of another depth map, these implementations effectively filter the depth map. This filtering removes all or part of the assumed noise that is in the depth map portion.

One result is that, for some implementations, there will be differences between collocated portions of two depth pictures that are large enough to produce a coding cost for a skip mode that is greater than a cost for at least one other coding mode. Accordingly, the skip mode would not ordinarily be selected in a rate-distortion optimization algorithm. However, such implementations use the skip mode despite the non-minimizing cost of the skip mode. The reason is that the cost of the skip mode is artificially high due to the noise in the depth pictures, and the failure of the skip mode to accurately code that noise. But the visual quality is improved by not accurately coding that noise, and by filtering the noise by using the skip mode.

In addition, with this strategy one can select temporal skip in depth automatically, whenever temporal skip in video has been chosen so that no skip mode information needs to be inserted in the depth bitstream. This leads to a reduction in the bitrate by signaling skip mode for both video and depth with a single indicator. This also leads to a reduction in the encoding complexity by omitting motion estimation and the mode decision process.

Note that a more precise depth map representation (with less false contours and flickering) would possibly limit the performance of the proposed method. However, the problem described above is inevitable to many existing depth acquisition systems. The proposed method provides a simple and efficient solution by using local video-characteristics to correct possible errors in a depth map. The proposed method results in improved subjective quality by reducing a flickering artifact due to temporal variation in the depth map.

The above discussion focused on the use of skip mode for depth map portions collocated across different points in time. However, other implementations apply the same technique to depth map (and video) portions collocated across different views at the same point in time. Further implementations apply the same technique to depth map (and video) portions collocated across different views at different points in time. Appropriate signaling can be provided to indicate that video and/or depth are coded in skip mode with respect to a particular view and a particular time. Implementations that examine different views would typically need a disparity vector, or equivalent information, to determine the collocated block in a different view.

Figure 10:
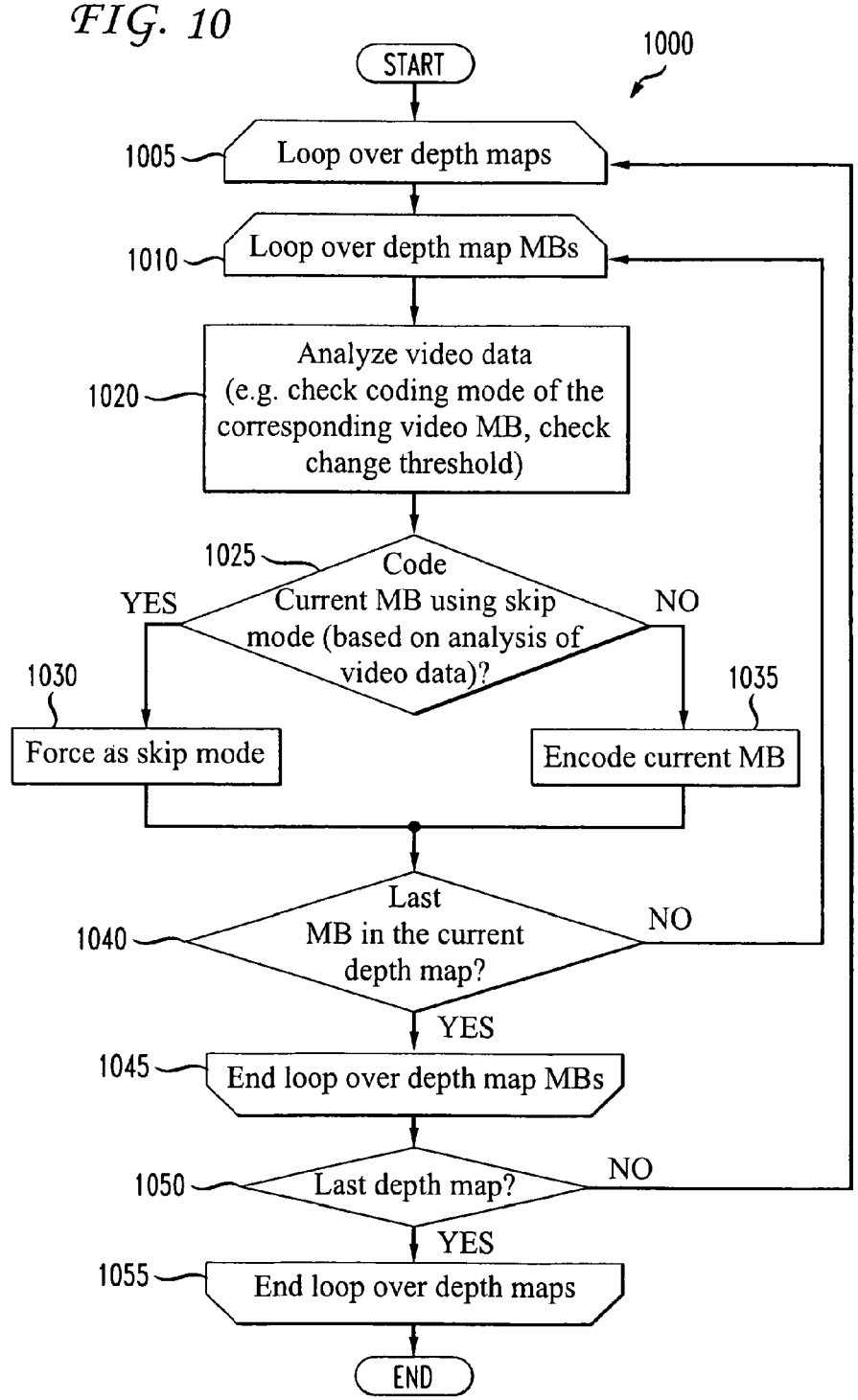
FIG. 10 is a diagram of an implementation of yet another encoding process.

FIG. 10 shows an exemplary video coding method 1000, in accordance with yet another embodiment of the present principles. Method 1000 corresponds to the above described embodiment 3. At step 1005, the loop over depth map begins. At step 1010, the loop over MBs within the depth map begins. At step 1020, video data is analyzed. For example, step 1020 may check whether or not the corresponding video macroblock is coded using skip mode and/or check the change in the video macroblock (as compared to a corresponding macroblock in a temporally distinct video macroblock) and compare against a change threshold.

At step 1025, it is determined whether or not the current macroblock should be coded using skip mode based on the analysis result from 1020. If so, then the method proceeds to step 1030. Otherwise, the method proceeds to step 1035. At step 1030, the current macroblock is forced to be encoded as skip mode. At step 1035, the current macroblock is encoded with a conventional method. At step 1040, it is determined whether or not the current macroblock is the last macroblock in the depth map. If so, then the method proceeds to step 1045. Otherwise, the method returns to step 1010 for the next macroblock. At step 1045, the loop over the depth map macroblocks is terminated. At step 1050, it is determined whether or not the current depth map is the last one in the depth sequence. If so, then the method proceeds to step 1055. Otherwise, the method returns to step 1005 for the next depth map. At step 1055, the loop over the depth maps is terminated.

Embodiment 4

Combined Depth Coding Scheme

The new distortion metric in embodiment 1 and embodiment 2 can be combined with the technique in one of the other embodiments, such as, for example, Embodiment 3, to achieve a higher coding efficiency and rendering quality.

Figure 11:
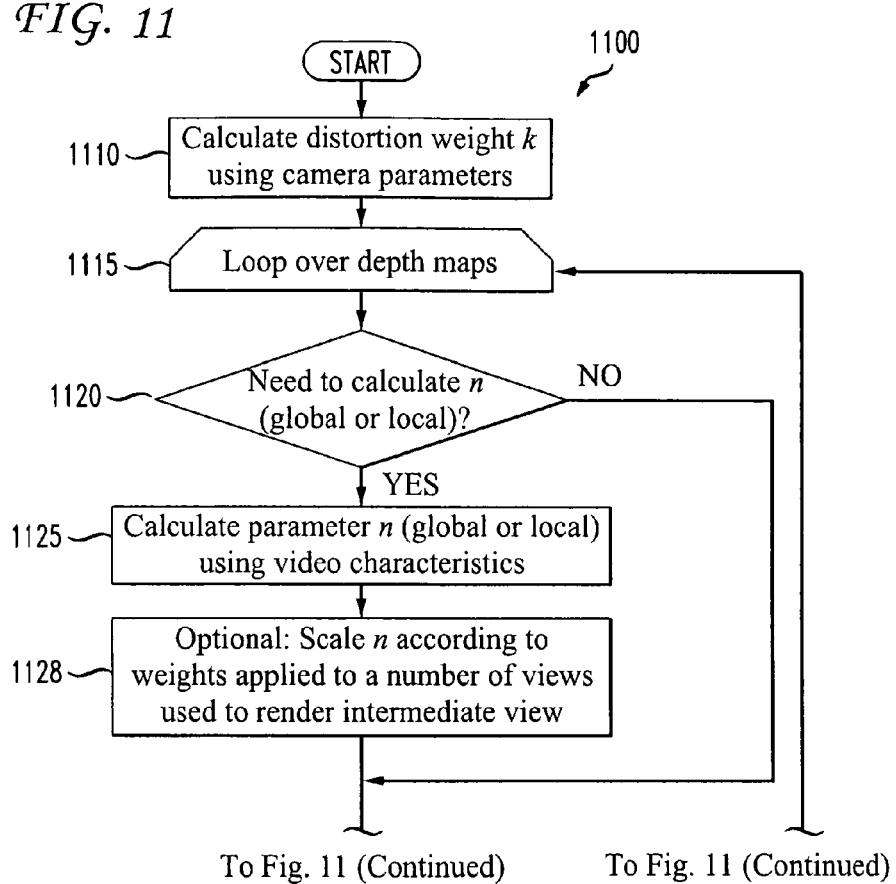
FIG. 11 is a diagram of an implementation of still another encoding process.
Figure 11:
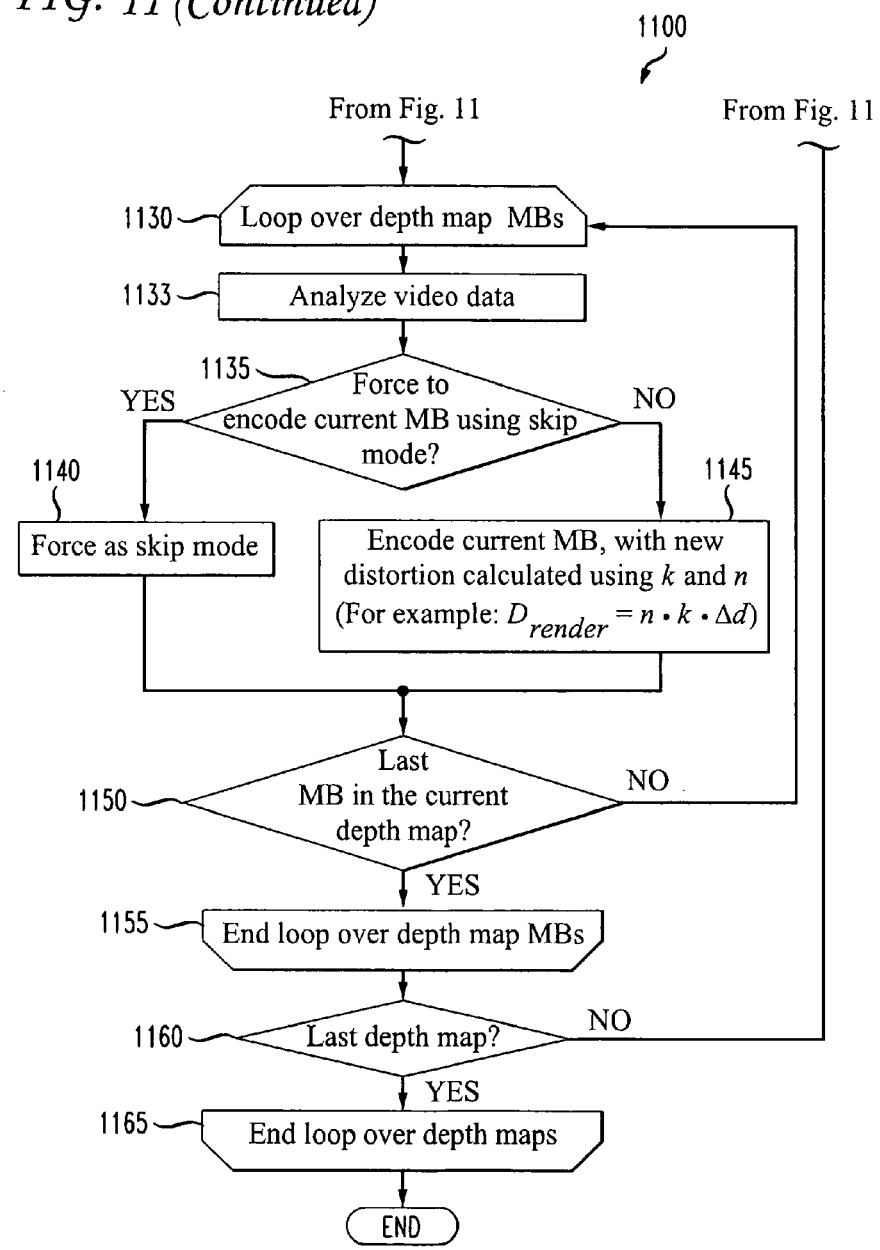

FIG. 11 shows an exemplary video coding method 1100, in accordance with still another embodiment of the present principles. Method 1100 corresponds to the above described embodiment 4. At step 1110, a distortion weight k is calculated using a camera parameter. At step 1115, a loop over depth maps begins. At step 1120, it is determined whether the parameter n (global or local) needs to be calculated. If so, then the method proceeds to step 1125. Otherwise the method proceeds to step 1130. At step 1125, one or more parameters n (global or local) are calculated using video characteristics. At step 1128, optionally, the parameters n are scaled based on the weights applied to a number of views used to render an intermediate view. At step 1130, a loop over macroblocks within the current depth map begins. At step 1133, video data is analyzed (e.g., check whether or not the corresponding video macroblock is coded using skip mode and/or check the change in video macroblock and compare against a change threshold). At step 1135, it is determined whether or not the current macroblock should be coded using skip mode based on the analysis results from step 1133. If so, then the method proceeds to step 1140. Otherwise, the method proceeds to step 1145. At step 1140, the current macroblock is forced to be encoded as skip mode. At step 1145, the current macroblock is encoded with the new distortion metric calculated using k and n, for example, as per Equation (12). Step 1145 could be performed using local or global parameter(s) n.

At step 1150, it is determined whether or not the current macroblock is the last macroblock in the depth map. If so, then the method proceeds to step 1155. Otherwise, the method returns to step 1130 for the next macroblock. At step 1155, the loop over the depth map macroblocks is terminated. At step 1160, it is determined whether or not the current depth map is the last one in the depth sequence. If so, then the method proceeds to step 1165. Otherwise, the method returns to step 1115 for the next depth map. At step 1165, the loop over the depth maps is terminated.

Figure 12:
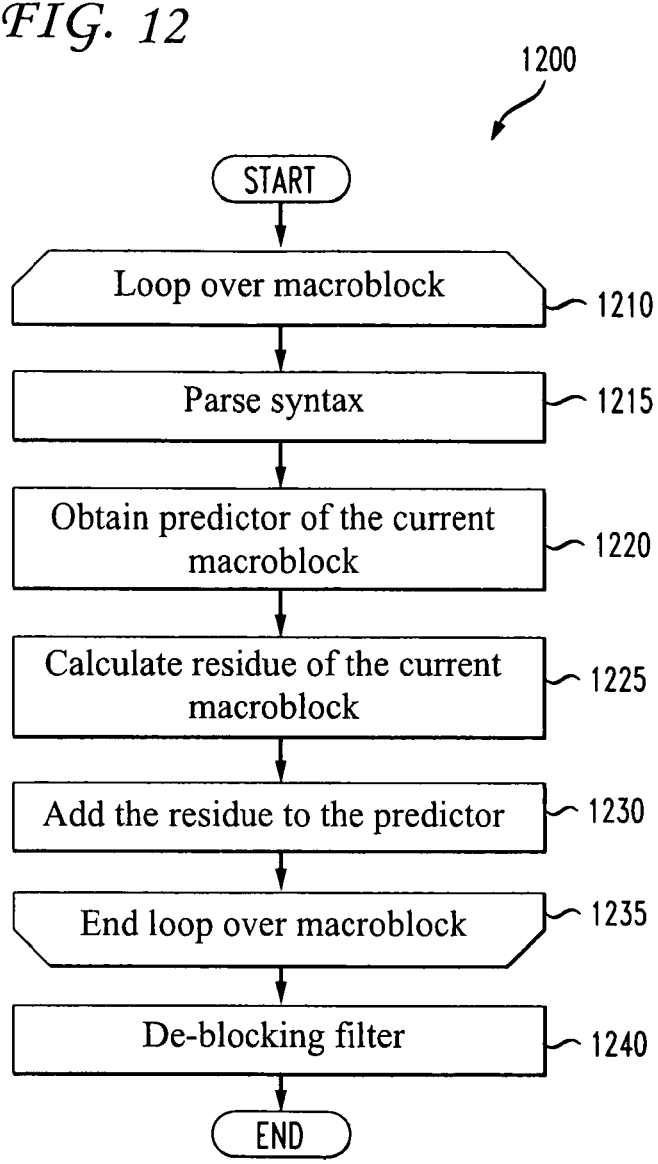
FIG. 12 is a diagram of an implementation of a decoding process.

FIG. 12 shows an exemplary video decoding method 1200, in accordance with yet another embodiment of the present principles. Method 1200 corresponds to any of the above described embodiments 1 through 4. That is, method 1200 may be used to decode an encoding produced by any of embodiments 1 through 4. At step 1210, a loop is performed over macroblocks. At step 1215, syntax is parsed. At step 1220, a predictor of the current macroblock is obtained. At step 1225, a residue of the current block is calculated. At step 1230, the residue is added to the predictor. At step 1235, the loop is terminated. At step 1240, deblock filtering is performed.

The new distortion metric and the skip mode selection scheme have been simulated using several multi-view test sequences. For each sequence, both video and depth map are encoded for two selected views. The decoded video and depth map are used to render an intermediate view between the two views.

First, the term k is calculated using the camera setting parameters for each sequence. Then n is found as described herein by estimating the effect of displacements in the first frame of the video sequence. The results of k, global n (embodiment 1) and BD-PSNR ("Bjontegaard Difference in Peak Signal-to-Noise Ratio) is given in Table 1. Note that each multi-view sequence is acquired in a different camera setting, which would affect the amount of geometry error differently, and this difference is well reflected in k. For the outdoor scene sequences $Z_{far}$, is large, thus $Z_{near}$ is the dominant parameter to decide k when the camera distance and focal length are similar. This can be seen in the "Lovebird 1" and "Lovebird 2" cases shown in TABLE 1, where the former captures nearer object (smaller $Z_{near}$), leading to larger k as calculated in Equation (5). With larger k, the position error becomes more sensitive to the depth distortion as in Equation (4). In the case of indoor scene sequences, all parameters can affect the amount of the position error caused by the depth distortion. For example, two indoor scene sequences, namely "Ballet" and "Dog", have quite different values of k, where the former has a dense camera setting to capture near objects compared to the latter. The second term n, depends on the image characteristics. Comparing the cases of "Champagne Tower" and "Ballet" in TABLE 1, n is larger for the former which includes a lot of objects, resulting in large distortion in the synthesized view by position error.

The video is coded using the MPEG-4 AVC Standard (joint model (JM) reference software version 13.2), and the depth map is coded using the MPEG-4 AVC Standard with and without the proposed methods. To simplify test conditions, the same encoding configuration is used for the video and depth maps including the QP values of 24, 28, 32, and 36, and the Lagrange multiplier values, and only I-slices and P-slices are used to code 15 depth maps for each view.

Subjective quality is improved because flickering artifacts are reduced. The flickering artifacts occur in the synthesized views due to the temporal variation in the depth map. By applying the skip mode selection method, erroneous depth map information is coded using skip mode and, as a result, the flickering artifact is reduced.

TABLE 1

| Sequence | k | n | BD-PSNR (dB) |
| --- | --- | --- | --- |
| Champagne Tower | 0.282 | 65.238 | 0.34 |
| Dog | 0.078 | 41.671 | 0.75 |
| Lovebird 1 | 0.214 | 24.807 | 0.24 |
| Lovebird 2 | 0.057 | 29.265 | 1.96 |
| Door Flowers | 0.090 | 15.810 | 1.23 |
| Newspaper | 0.275 | 38.653 | 0.75 |
| Ballet | 0.442 | 7.723 | 1.23 |
| Breakdancers | 0.383 | 11.430 | 0.29 |

As used herein, the term "picture" refers to either a frame or field. Additionally, throughout this application, wherever the term "frame" is used, alternate implementations may be devised for a field or, more generally, for a picture.

Moreover, as used herein, the phrase "coding gain" refers to one or more of the following: for a given coding bitrate, the reduction in rendering distortion, measured in terms of, for example, SSD; or for a given rendering distortion (measured in SSD, for example), the reduction in coding bitrate.

Further, as used herein, the phrase "distortion in rendered video" refers to a distortion between the video rendered using compressed depth and the video rendered using uncompressed depth. The actual distortion value may be determined in various ways, and using various measures. For example, the distortion value may be determined using SSD as the distortion measure.

Also, as is known skip mode refers to the SKIP mode as specified in MPEG-4 AVC Standard. That is, in SKIP mode there is no prediction residue and no motion vector to be transmitted. The reconstructed block is obtained by simply copying the corresponding block in previously encoded pictures. The block correspondence is identified by simply using the predicted motion vector obtained using motion information in neighboring blocks.

Additionally, it is to be appreciated that while one or more embodiments of the present principles are described herein with respect to the MPEG-4 AVC standard, the present principles are not limited to solely this standard and, thus, may be used with respect to other video coding standards, recommendations, and extensions thereof, including extensions of the MPEG-4 AVC standard, while maintaining the spirit of the present principles.

In at least one implementation, it is preferred to apply "global" and "localized" values of n to other frames and/or regions, so that there is some utility from the work of calculating n. That is, an encoder might calculate n for a frame or a portion of a frame, and then merely use that n for that frame/portion, but this may not be very efficient. It may be better to use that n for, for example, (i) all the other frames in that sequence, or (ii) all the other portions that are similar (e.g. "sky" portions), and so forth.

A "portion" of a picture, as used in this application, refers to all or part of the picture. A portion may be, for example, a pixel, a macroblock, a slice, a frame, a field, a picture, a region bounding an object in the picture, the foreground of the picture, the background of the object, or a particular set of (x,y) coordinates in the picture. A translation of a portion may refer, for example, to a translation of a particular set of (x,y) coordinates. For example, a portion may include the pixel at location (x1, y1), and a translation (represented by "T") of the portion may include the pixel at location (x1−T, y1).

In at least one implementation, an encoder performs the following operations to determine n for a given depth map:

For a given depth distortion, we know the translational error in the resulting rendered video, via k, which is determined based on camera parameters including focal length, baseline distance, as calculated in equation (3).

We take the picture (or portion) and translate it by the translational error, then calculate the resulting video distortion. This involves a summation over all pixels in the picture (or portion) of, if you use MSE, $(I(x,y)-I(x-shift,y))^2$, and then dividing by the number of pixels. This gives us a (translational error, video distortion) point, which is one point on a graph having translation error on the x-axis and video distortion on the y-axis. We then do the same for a variety of values of translation error (corresponding to a variety of values of depth distortion), and chart this, and then fit a line to get an estimation of n.

We use this estimated n for the picture/portion in performing the rate-distortion optimization encoding of the depth map, or we can use an actual plotted value of video distortion. We also use this value of n for other pictures/portions. In additional implementations, we also create a library of values of n, for different types of scenes for example. Scenes may include, for example, sky, woods, grass (for example, a sports playing field), or water.

Throughout this disclosure, we refer to the "video" for a given location. References to "video" may include any of various video components or their combinations. Such components, or their combinations, include, for example, luminance, chrominance, Y (of YUV or YCbCr or YPbPr), U (of YUV), V (of YUV), Cb (of YCbCr), Cr (of YCbCr), Pb (of YPbPr), Pr (of YPbPr), red (of RGB), green (of RGB), blue (of RGB), S-Video, and negatives or positives of any of these components. Various implementations consider the video distortion that arises in rendered views. Accordingly, those rendered views may include, or be limited to, one or more of various components of video.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, this application and its claims refer to "determining" various pieces of information. Determining the information may include one or more of, for example, estimating the information, calculating the information, predicting the information, or retrieving the information from memory.

Further, this application frequently refers to a "view". It is to be understood that a "view" may typically refer to an actual picture from that view. In other instances, however, a "view" may refer, for example, to the actual view position, or to a series of pictures from a view. The meaning will be revealed from context.

We thus provide one or more implementations having particular features and aspects. However, features and aspects of described implementations may also be adapted for other implementations. Although implementations described herein may be described in a particular context, such descriptions should in no way be taken as limiting the features and concepts to such implementations or contexts.

Implementations may signal information using a variety of techniques including, but not limited to, slice headers, supplemental enhancement information (SEI) messages or other messages, other high level syntax, non-high-level syntax, out-of-band information, data-stream data, and implicit signaling. Accordingly, although implementations described herein may be described in a particular context, such descriptions should in no way be taken as limiting the features and concepts to such implementations or contexts.

Additionally, many implementations may be implemented in one or more of an encoder, a pre-processor to an encoder, a decoder, or a post-processor to a decoder. The implementations described or contemplated may be used in a variety of different applications and products. Some examples of applications or products include set-top boxes, cell phones, personal digital assistants (PDAs), televisions, personal recording devices (for example, PVRs, computers running recording software, VHS recording devices), camcorders, streaming of data over the Internet or other communication links, and video-on-demand.

The implementations described herein may be implemented in, for example, a method or a process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of equipment include video coders, video decoders, video codecs, web servers, set-top boxes, laptops, personal computers, cell phones, PDAs, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium having instructions for carrying out a process.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data instructions for performing one of the depth map encoding techniques described in this application or to carry the actual encoding of the depth map. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. Further, the signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

The invention claimed is:

1. A method comprising:
    determining a depth coding rate that results from coding one or more portions of a depth map using a particular coding mode, wherein the depth map is for a particular view and the depth map can be used to render video for a different view than the particular view to produce a rendered video;

determining a depth map distortion that results from coding the one or more portions of the depth map using the particular coding mode;

determining a value of distortion for the rendered video based on the depth map distortion and based on a particular relationship between the depth map distortion and values of distortion for the rendered video;

determining whether to use the particular coding mode to code the one or more portions of the depth map based on the value of distortion for the rendered video and the depth coding rate; and coding the one or more portions of the depth map using the particular coding mode.

2. The method of claim 1 wherein determining the value of distortion for rendered video is performed without using the rendered video.

3. The method of claim 1 wherein the particular relationship between the depth map distortion and the value of distortion for rendered video is a linear relationship.

4. The method of claim 1, wherein the particular relationship is determined using camera parameters.

5. The method of claim 1, wherein the particular relationship is indicated by a global parameter that applies to an entire picture of video.

6. The method of claim 5, wherein the global parameter is estimated using a difference between at least a portion of the entire picture and a plurality of translated versions of at least the portion of the entire picture, to obtain a plurality of data points of pixel value distortion due to different translations.

7. The method of claim 6, further comprising processing the plurality of data points to determine an estimate of the global parameter that linearly relates pixel distortions and the different translations.

8. The method of claim 5, wherein the global parameter is scaled according to weights applied to a number of reference views used to render an intermediate view.

9. The method of claim 1, wherein the particular relationship is indicated by a local parameter that applies to one or more portions, but less than all, of a picture of video.

10. The method of claim 9, wherein the picture is partitioned into a plurality of regions based on one or more parameters, and the method further comprises estimating the local parameter for a region of the plurality of regions, the region including the one or more portions, using a difference between at least part of the region and a plurality of translated versions of at least the part of the region, to obtain a plurality of data points of pixel value distortion due to different translations.

11. The method of claim 10, further comprising processing the plurality of data points for the region to determine an estimate of the local parameter for the region, and the estimate of the local parameter linearly relates pixel distortions and the different translations for the region.

12. The method of claim 11, further comprising using the estimate of the local parameter for the region to determine a distortion for a macroblock that belongs to the region.

13. The method of claim 9, wherein the local parameter is scaled according to weights applied to a number of reference views used to render an intermediate view.

14. The method of claim 1, wherein the particular relationship is indicated, for different scenes, by a stored set of values for different types of scenes.

15. The method of claim 1, wherein at least a portion of the depth map is coded using skip mode when a corresponding picture portion to which the depth map corresponds is encoded using skip mode.

16. The method of claim 1 wherein determining whether to use the particular coding mode based on the value of distortion for the rendered video and the depth coding rate comprises determining a cost associated with the particular coding mode as a function of the value of distortion and the depth coding rate.

17. The method of claim 1 wherein determining the value of distortion for the rendered video comprises determining the value by estimating the value.

18. An apparatus comprising:
means for determining a depth coding rate that results from coding one or more portions of a depth map using a particular coding mode, wherein the depth map is for a particular view and the depth map can be used to render video for a different view than the particular view to produce a rendered video;

means for determining a depth map distortion that results from coding the one or more portions of the depth map using the particular coding mode;

means for determining a value of distortion for the rendered video based on the depth map distortion and based on a particular relationship between the depth map distortion and values of distortion for the rendered video; and means for determining whether to use the particular coding mode to code the one or more portions of the depth map based on the value of distortion for the rendered video and the depth coding rate; and means for coding the one or more portions of the depth map using the particular coding mode.

19. The apparatus of claim 18, wherein the apparatus is implemented in a video encoder.

20. A non-transitory processor readable medium having stored thereon instructions for causing a processor to perform at least the following:
determining a depth coding rate that results from coding one or more portions of a depth map using a particular coding mode, wherein the depth map is for a particular view and the depth map can be used to render video for a different view than the particular view to produce a rendered video;

determining a depth map distortion that results from coding the one or more portions of the depth map using the particular coding mode;

determining a value of distortion for the rendered video based on the depth map distortion and based on a particular relationship between the depth map distortion and values of distortion for the rendered video;

determining whether to use the particular coding mode to code the one or more portions of the depth map based on the value of distortion for the rendered video and the depth coding rate; and coding the one or more portions of the depth map using the particular coding mode.

21. An apparatus, comprising a processor configured to perform at least the following:
determining a depth coding rate that results from coding one or more portions of a depth map using a particular coding mode, wherein the depth map is for a particular view and the depth map can be used to render video for a different view than the particular view to produce a rendered video;

determining a depth map distortion that results from coding the one or more portions of the depth map using the particular coding mode;

determining a value of distortion for the rendered video based on the depth map distortion and based on a particular relationship between the depth map distortion and values of distortion for the rendered video;
determining whether to use the particular coding mode to code the one or more portions of the depth map based on the value of distortion for the rendered video and the depth coding rate; and
coding the one or more portions of the depth map using the particular coding mode.

22. An apparatus comprising an encoder for performing at least the following operations:
determining a depth coding rate that results from coding one or more portions of a depth map using a particular coding mode, wherein the depth map is for a particular view and the depth map can be used to render video for a different view than the particular view to produce a rendered video;
determining a depth map distortion that results from coding the one or more portions of the depth map using the particular coding mode;
determining a value of distortion for the rendered video based on the depth map distortion and based on a particular relationship between the depth map distortion and values of distortion for the rendered video;
determining whether to use the particular coding mode to code the one or more portions of the depth map based on the value of distortion for the rendered video and the depth coding rate; and
coding the one or more portions of the depth map using the particular coding mode.

23. An apparatus comprising:
an encoder for performing at least the following operations:
determining a depth coding rate that results from coding one or more portions of a depth map using a particular coding mode, wherein the depth map is for a particular view and the depth map can be used to render video for a different view than the particular view to produce a rendered video,
determining a depth map distortion that results from coding the one or more portions of the depth map using the particular coding mode,
determining a value of distortion for the rendered video based on the depth map distortion and based on a particular relationship between the depth map distortion and values of distortion for the rendered video,
determining whether to use the particular coding mode to code the one or more portions of the depth map based on the value of distortion for the rendered video and the depth coding rate;
coding the one or more portions of the depth map using the particular coding mode; and
a modulator for modulating a signal that includes a coding of the one or more portions of the depth map using the particular coding mode.

24. The apparatus of claim 23 wherein determining the value of distortion for rendered video is performed without using the rendered video.

25. The apparatus of claim 23 wherein the particular relationship between the depth map distortion and the value of distortion for rendered video is a linear relationship.

26. The apparatus of claim 23, wherein the particular relationship is determined using camera parameters.

27. The apparatus of claim 23, wherein the particular relationship is indicated by a global parameter that applies to an entire picture of video.

28. The apparatus of claim 23, wherein the global parameter is estimated using a difference between at least a portion of the entire picture and a plurality of translated versions of at least the portion of the entire picture, to obtain a plurality of data points of pixel value distortion due to different translations.

29. The apparatus of claim 28, further comprising processing the plurality of data points to determine an estimate of the global parameter that linearly relates pixel distortions and the different translations.

30. The apparatus of claim 27, wherein the global parameter is scaled according to weights applied to a number of reference views used to render an intermediate view.

31. The apparatus of claim 23, wherein the particular relationship is indicated by a local parameter that applies to one or more portions, but less than all, of a picture of video.

32. The apparatus of claim 31, wherein the picture is partitioned into a plurality of regions based on one or more parameters, and the method further comprises estimating the local parameter for a region of the plurality of regions, the region including the one or more portions, using a difference between at least part of the region and a plurality of translated versions of at least the part of the region, to obtain a plurality of data points of pixel value distortion due to different translations.

33. The apparatus of claim 32, further comprising processing the plurality of data points for the region to determine an estimate of the local parameter for the region, and the estimate of the local parameter linearly relates pixel distortions and the different translations for the region.

34. The apparatus of claim 33, further comprising using the estimate of the local parameter for the region to determine a distortion for a macroblock that belongs to the region.

35. The apparatus of claim 31, wherein the local parameter is scaled according to weights applied to a number of reference views used to render an intermediate view.

36. The apparatus of claim 23, wherein the particular relationship is indicated, for different scenes, by a stored set of values for different types of scenes.

37. The apparatus of claim 23, wherein at least a portion of the depth map is coded using skip mode when a corresponding picture portion to which the depth map corresponds is encoded using skip mode.

38. The apparatus of claim 23 wherein determining whether to use the particular coding mode based on the value of distortion for the rendered video and the depth coding rate comprises determining a cost associated with the particular coding mode as a function of the value of distortion and the depth coding rate.

39. The apparatus of claim 23 wherein determining the value of distortion for the rendered video comprises determining the value by estimating the value.

* * * * *